United States Patent
Zhang et al.

(10) Patent No.: US 10,469,860 B1
(45) Date of Patent: Nov. 5, 2019

(54) CHUNK PARALLEL TRANSCODING USING OVERLAPPING FRAMES

(71) Applicant: HULU, LLC, Santa Monica, CA (US)

(72) Inventors: Wenhao Zhang, Beijing (CN); Deliang Fu, Beijing (CN); Juncheng Ma, Beijing (CN); Chen Liu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 16/012,419

(22) Filed: Jun. 19, 2018

(51) Int. Cl.
  *H04N 19/40* (2014.01)
  *H04N 19/172* (2014.01)
  *H04N 19/30* (2014.01)
  *H04N 19/46* (2014.01)

(52) U.S. Cl.
  CPC ......... *H04N 19/40* (2014.11); *H04N 19/172* (2014.11); *H04N 19/30* (2014.11); *H04N 19/46* (2014.11)

(58) Field of Classification Search
  CPC ...... H04N 19/40; H04N 19/46; H04N 19/172; H04N 19/30
  USPC .................................................. 375/240.01
  See application file for complete search history.

(56) References Cited

U.S. PATENT DOCUMENTS

2016/0219286 A1* 7/2016 Gadepalli ............ H04N 19/127
2018/0192158 A1* 7/2018 Smith .................. H04N 21/812

OTHER PUBLICATIONS

U.S. Appl. No. 16/030,688, filed Jul. 9, 2018 by Zhang et al. (Unpublished. Copy available via USPTO's IFW System).

* cited by examiner

*Primary Examiner* — Allen C Wong

(57) ABSTRACT

In one embodiment, a method generates chunk boundaries that are used to form a plurality of chunks from a video. The chunks are transcoded by transcoding units in parallel. The method selects at least one of a first number of frames before a first boundary of a chunk and a second number of frames after a second boundary of the chunk. A chunk is generated that includes the at least one of the first number of frames and the second number of frames, and a third number of frames between the first boundary and the second boundary. Then, the chunk is transcoded to generate a transcoded chunk using a first transcoding unit. The chunk is sent to a chunk assembler where the chunk assembler removes the at least one of the first number of frames and the second number of frames from the chunk and adds the chunk to a transcoded bitstream.

20 Claims, 8 Drawing Sheets

CHUNK PARALLEL TRANSCODING USING OVERLAPPING FRAMES

BACKGROUND

Media programs, including audio-video data, are increasingly distributed over telecommunications networks for the viewing and enjoyment of users. Services provide media programs to users through various video delivery technologies (e.g., streaming). For example, the service may allow a user to view the latest television shows or movies using a media player. After a television show airs, the service may experience a high demand for the television show. In one example, a media program provider provides the television show to the service. The service then needs to transcode the television show before the service can make the television show available to the users. For example, the television show may need to be transcoded into different bitrates. Due to the popularity of the video, the service would like to transcode the media program as fast as possible. However, if the transcoding is performed by one transcoder, the service must wait until the transcoder finishes transcoding the entire television show before making the television show available to users. A typical runtime for transcoding a two-hour 1080p video is about 48 hours using H.264 transcoder. Also, if a higher video resolution video, such as a 4K resolution or even higher, and a more complicated transcoding technique such as High Efficiency Video Coding (HEVC)/H.265 or VP9 is used, the transcoding time of new video content will dramatically increase.

One way of transcoding the video faster is to splice the video into multiple chunks and transcode the video using multiple transcoders. Thus, the transcoding can be performed in parallel and the transcoded parts of the video from the transcoders are combined into a single bitstream. While improving the time taken to transcode the video, the splicing method introduces quality issues. For example, a transcoding model, such as a rate control model, inside the transcoder requires a serial transcoding, which will be broken by the parallel transcoding. That is, the transcoder independently processes video within the chunk boundaries. Thus, video quality fluctuation may occur at the chunk boundaries.

DETAILED DESCRIPTION

Figure 1:
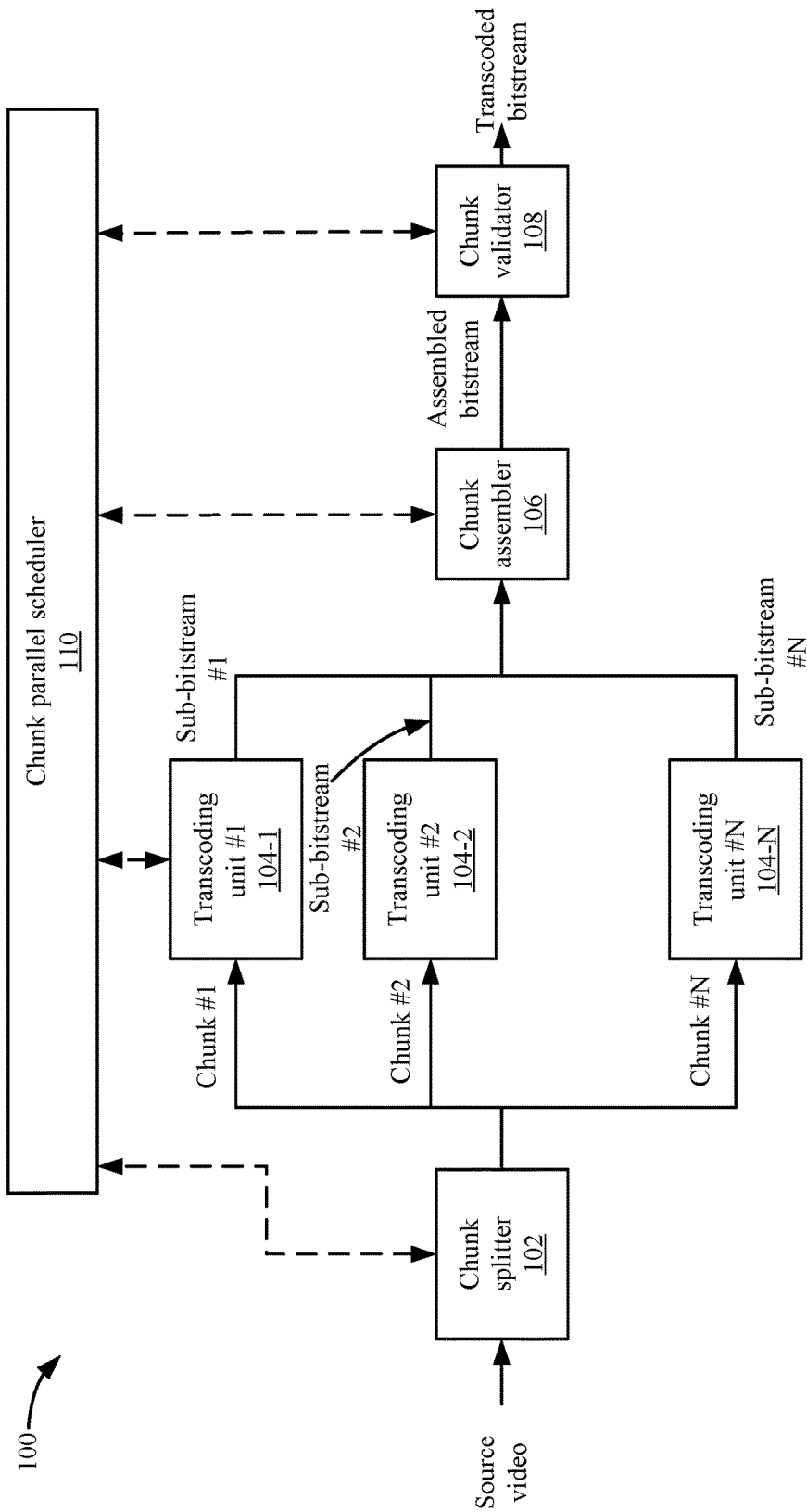
FIG. 1 depicts a simplified system for performing chunk parallel transcoding according to some embodiments.

Described herein are techniques for a video transcoding system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments use a chunk parallel transcoding technique that transcodes chunks of a video in parallel using multiple transcoding units in a transcoding cloud system. The chunk parallel transcoding technique may decrease the time needed to transcode the video compared to performing the transcoding of the video in serial. The transcoding units are configured to transcode the video independently. That is, each chunk of video is processed and compressed on a single transcoding unit frame-by-frame from beginning to end in a serial manner. The chunk parallel transcoding may split one video asset into multiple chunks that are processed and transcoded by multiple transcoding units in parallel. For example, a two-hour video may be split into 12 ten-minute chunks that are transcoded into 12 sub-bitstreams by 12 transcoding units in parallel. When the transcoding of the chunks is finished, the system assembles the sub-bitstreams into a full-length transcoded bitstream that represents the transcoding of the entire video.

Splitting the video into multiple chunks may introduce quality issues in the final transcoded bitstream. For example, quality fluctuation may be observed across transcoded sub-bitstreams for chunks especially at the boundaries of the chunks. One reason the quality issue occurs at the boundaries is that a transcoding unit serially transcodes the video and when the video is split at a chunk boundary, the video before the video is not used in the transcoding of the chunk. This limits the quality of the transcoding that the transcoding unit can perform because the transcoding unit cannot use the frames before the boundary to transcode the frames after the boundary. This may result in quality issues at the boundaries.

Some embodiments address the quality issue by generating chunks that include frames before a left chunk boundary and/or after a right chunk boundary. For example, the system can generate chunk boundaries for the video to form chunks from the video. Then, the system can select a first number of frames before a left boundary of the chunk and/or a second number of frames after the right boundary of the chunk. The number of frames selected may be based on the analysis of different factors, such as the content of the chunk around the boundary. For example, if the video is similar around the chunk, then more frames around the chunk boundary may be used because the transcoding can be further enhanced using the additional frames. However, if the content around the boundary is vastly different, then content from the frames outside the boundary may not be useful in performing the transcoding and thus fewer frames may be used outside the boundary. In other embodiments, a fixed number of frames outside the chunk boundaries may be used.

The system then generates chunks that includes the frames before a left chunk boundary or after a right chunk boundary for the chunk. The chunks are then transcoded in parallel using the transcoding units. Because the transcoded bitstreams include extra overlapping frames, the system may analyze the transcoded bitstreams and remove the extra frames. Then, the system assembles the chunks into a final transcoded bitstream.

System Overview

FIG. 1 depicts a simplified system 100 for performing chunk parallel transcoding according to some embodiments. System 100 transcodes a source video asset, which may be any type of video, such as for a television show, movie, or video clip. The source video may need to be transcoded into one or more formats, such as one or more bitrates, and also within a certain time, such as within 24 hours of receiving the video. To decrease the time needed to transcode the source video, system 100 may use the chunk parallel transcoding techniques described herein.

A chunk splitter 102 receives the source video and can split the source video into multiple chunks. A chunk may be a portion of video in the source video. For example, chunk splitter 102 may receive a file with the source video that is the full length of the video and then split the video into multiple chunks.

In some examples, chunk splitter 102 may first determine chunk boundaries for the source video. A chunk may define a boundary for the chunk that will be transcoded by one of transcoding units 104-1 to 104-N. A chunk may include a left boundary that defines the starting point of the chunk and a right boundary that defines the end of the chunk. As will be discussed in more detail below, chunk splitter 102 may initially determine the chunk boundaries, such as using ten-minute intervals for the chunk boundaries. Then, chunk splitter 102 may also analyze the chunk boundaries and determine frames before the left boundary and/or frames after the right boundary to add to the chunk. The addition of the frames to the chunk may allow transcoding units 104 to perform a higher quality transcoding of the chunk compared to if only the video within the boundaries was used. The higher quality transcoding may be possible because transcoding unit 104 can use the frames outside the boundary when transcoding the frames within the boundaries.

Transcoding units 104 may be a software video processor/transcoder configured on a computer processing unit (CPU), a hardware accelerated video processor/transcoder with a graphical processing unit (GPU), or field programmable gate array (FPGA), and/or a hardware processor/transcoder implemented in an application-specific integrated circuit (ASIC). Each transcoding unit 104 may be situated in a different device, in the same device, or combined into multiple devices. In some embodiments, a number of transcoding units 104 in a cloud computing environment can be configured depending on the number of chunks output by chunk splitter 102. Transcoding may be the conversion from one digital format to another digital format. Transcoding may involve decoding the source format and encoding the source video into another digital format, or converting the source content into videos with a specific resolution, framerate, bitrate, codec, etc. Also, encoding may be the conversion of analog source content and to a digital format. As used, the term transcoding may include encoding.

Transcoding units #1 to #N (104-1 to 104-N) receive the chunks and transcode the chunks in parallel. For example, transcoding unit #1 receives a chunk #1; transcoding unit #2 receives a chunk #2; and transcoding unit #N receives a chuck #N. Although transcoding units may process only one chunk per source video, it is possible that transcoding units 104 may process more than one chunk per source video. However, for a complete parallel transcoding, the number of chunks may equal the number of transcoding units 104.

A transcoding unit 104 may receive a chunk of video and then output one sub-bitstream. The chunk of video may include the extra frames before and/or after the chunk boundaries and the sub-bitstream may be the transcoding of all of the frames that were received. That is, the sub-bitstream includes the transcoding of the frames before the left chunk boundary, the frames within the chunk boundaries, and the frames after the right chunk boundary. In some embodiments, for a certain time, each transcoding unit 104 can transcode a single chunk and output a single sub-bitstream.

A chunk assembler 106 receives N sub-bitstreams, such as one from each transcoding unit 104. Then, chunk assembler 106 assembles the sub-bitstreams and can generate an assembled bitstream. The assembled bitstream is a single transcoded bitstream for the source video.

Chunk assembler 106 cascades the sub-bitstreams according to the temporal order of the chunks. As will be described in more detail below, chunk assembler 106 determines where to remove the overlapping frames for the chunks, such as the frames that were added before the left boundary and/or after the right boundary for the chunks. Then, chunk assembler 106 assembles the chunks together into the assembled bitstream.

Chunk validator 108 receives the assembled bitstream and can validate the bitstream. The validation may check the assembled bitstream based on different factors. For example, the factors may include completeness, correctness, overall quality, and cross-chunk quality. Completeness checks that there are no missing chunks, correctness checks that the chunks are in right order, overall quality checks the overall bitrate complies with any bitrate requirements, and cross-chunk quality checks a fluctuation of bitrate and quality across chunks are within pre-defined conditions.

Chunk parallel scheduler 110 may collect information from chunk splitter 102, transcoding unit 104, chunk splitter 106, and chunk validator 108 to coordinate the scheduling of the various stages of the transcoding of the source video. Chunk parallel scheduler 110 can coordinate the chunk parallel transcoding to achieve the optimal chunk parallel transcoding results. For example, chunk parallel scheduler 110 may schedule chunk splitter 102 to split the source video into chunks. Then, chunk parallel scheduler 110 configures the number of transcoding units 104 that are needed and schedules the transcoding at transcoding units 104. Thereafter, chunk parallel scheduler 110 schedules chunk assembler 106 to assemble the sub-bitstreams into an assembled bitstream. Then, chunk parallel scheduler 110 schedules chunk validator 108 to validate the assembled bitstream.

Chunk Generation

Figure 2:
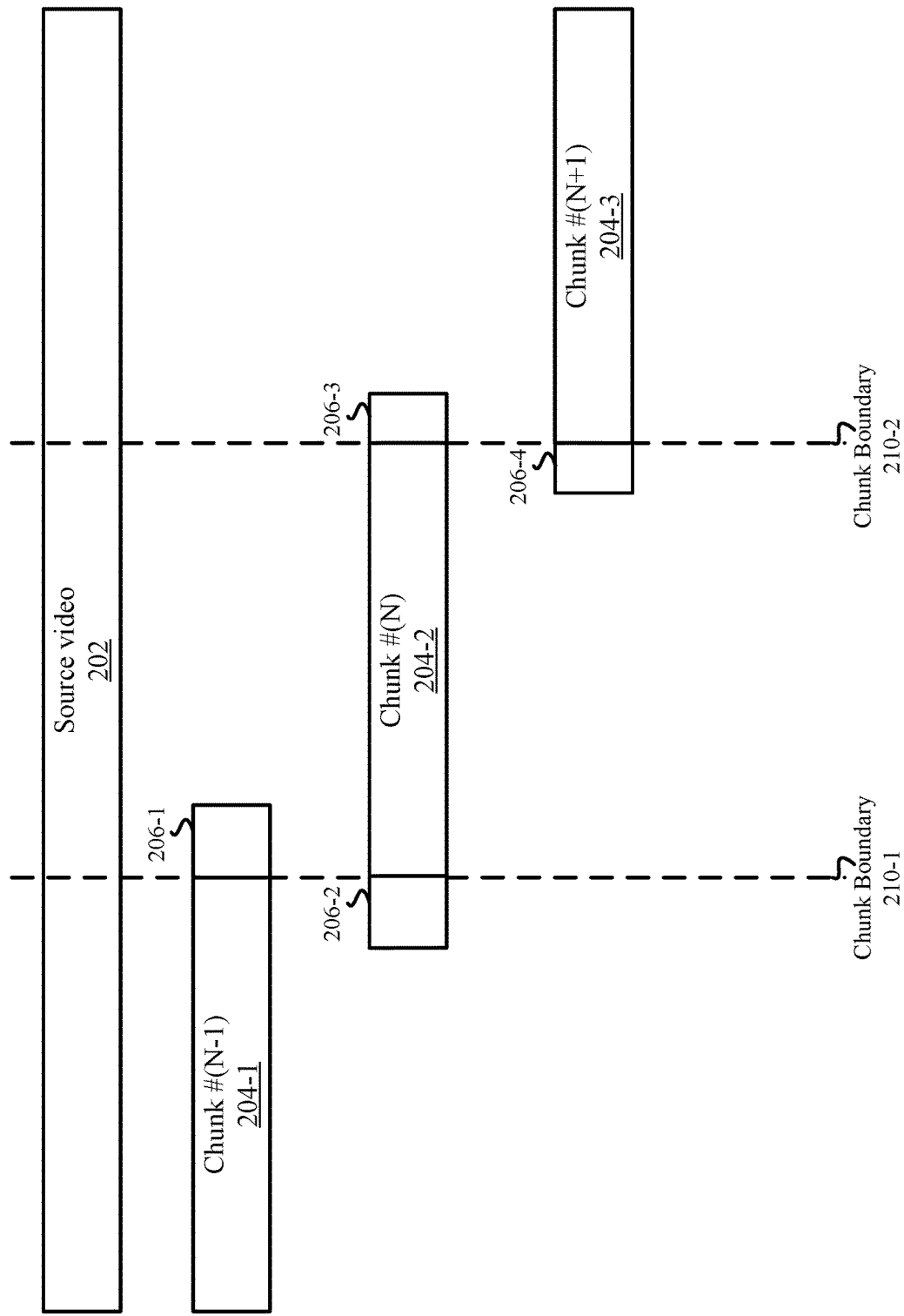
FIG. 2 depicts an example of adding frames to chunks according to some embodiments.

As discussed above, system 100 improves the chunk parallel transcoding process by adding frames before a left chunk boundary and/or after a right chunk boundary of a chunk. FIG. 2 depicts an example of adding frames to chunks according to some embodiments. Source video 202 is split into chunks 204-1 to 204-3. Although three chunks are described, it will be understood that any number of chunks may be used.

In some embodiments, chunk splitter 102 generates chunk boundaries for source video 202 using different processes. For example, fixed-length chunks and fixed-count chunks may be used. For the fixed-length chunks, chunk splitter 102 generates chunk boundaries every T seconds of source video 202. For the fixed-count chunks process, given a fixed count of C, chunk splitter 102 generates chunk boundaries to generate C even-length chunks. It is possible that the last chunk may not be an even length.

Other methods to generate chunk boundaries include using scene-change chunk boundaries, IDR chunk boundaries, or fixed-size/similar-size chunk boundaries. For the scene-change chunk boundaries, chunk splitter 102 analyzes source video 202 to determine when scene changes occur. For example, scene changes may be when a large amount of content changes in the video because the scene changes from one location to another location. Also, the scene-change chunks may be determined at different camera shots. In some embodiments, chunk splitter 102 generates chunk boundaries in source video 202 to generate variable length chunks based on when boundaries of scene changes occur.

IDR frames exist in certain transcoding protocols, such as H.264/AVC, Motion Pictures Experts Group (MPEG) 4, etc. An IDR frame may be a first picture that is transcoded in a group of pictures that are transcoded together. Although an IDR frame is described, other frames may be used, such as an I frame. Typically, an IDR frame or an I frame may be transcoded without reference to any other frames. Chunk splitter 102 may determine the positions of IDR frames and then generate chunk boundaries in source video 202 using the position of IDR frames as boundaries. The resulting chunks may be of variable length depending on the IDR positions of in source video 202. The size of each chunk will not be identical since the chunk boundary may happen when IDR frames occur.

The fixed-size or similar-size chunks are different from the fixed-length chunk in that the size of the chunks does not depend on the length. That is, the size may be the number of bytes in the chunk. The size may be used when the network transition efficiency of the chunks is optimized because the network can deliver chunks of the same size. Chunk splitter 102 generates chunk boundaries every T bytes of source video 202.

As discussed above, chunk splitter 102 adds extra frames to the chunks. In FIG. 2, chunk splitter 102 generates two chunk boundaries 208-1 and 208-2. Each chunk may have a left chunk boundary and a right chunk boundary. For discussion purposes, chunk boundaries for chunk #(N) (where N is a number in a temporal order of the video, such as Chunk #5 when N=5) are shown, but other chunk boundaries exist for the other chunks. For chunk #(N−1) 204-1, frames after chunk boundary 210-1 are included at 206-1. The number of frames that are included may be based on analyzing the characteristics of the video around the boundary. In other embodiments, a fixed number of frames may be added. Chunk #(N−1) may include frames before its left boundary, but are not shown for this example.

For chunk #(N) 204-2, frames at 206-2 and 206-3 may be added before chunk boundary 210-1 and after chunk boundary 210-2, respectively. The total chunk length is the frames at 206-2, the frames in chunk #(N) 204-2, and the frames at 206-3. For chunk #(N+1) 204-3, frames at 206-4 before chunk boundary 210-2 are added. Chunk #(N+1) may include frames after its right boundary, but are not shown in this example.

The extra frames before a left chunk boundary may be referred to as backward overlapping frames and the extra frames after a right chunk boundary may be referred to as forward overlapping frames. The frames are overlapping frames because the frames overlap with frames in another chunk. For example, frames at 206-2 of chunk #(N) overlap with frames in chunk #(N−1) and frames at 206-3 of chunk #(N) overlap with frames in chunk #(N+1). The total number of frames in a chunk may be calculated as:

Length of chunk #(N)=L_BWD+L+L_FWD, where L_BWD is the backward overlapping frames, L is the number of frames in the chunk and L_FWD is the forward overlapping frames.

Depending on the number of frames in the backward overlapping frames or forward overlapping frames, a chunk could be one of four cases:

Non-overlapped, if both backward overlapping frames and forward overlapping frames are equal to zero;

Forward only overlapping, if the forward overlapping frames is non-zero but the backward overlapping frames is zero;

Backward only overlapping, if the forward overlapping frames is zero but the backward overlapping frames is non-zero;

Bi-directional overlapping if both the forward overlapping frames and backward overlapping frames are non-zero.

Chunk splitter 102 may set the forward overlapping frames and backward overlapping frames as fixed values. For example, a pre-defined parameter may be used for a certain source video 202. Also, chunk splitter 102 may dynamically determine the number of backward overlapping frames and the forward overlapping frames for each chunk. For example, chunk splitter 102 may analyze the video characteristics near the chunk boundaries to select the number of backward overlapping frames and forward overlapping frames. The characteristics may include different content complexities that describe characteristics of content, such as a number of objects, the amount of edges, the magnitude of texture, etc. in the content. Also, the characteristics may include temporal complexities, such as the magnitude of object motion, the diversity of motion directions, etc. When the change in content increases, then the need to include frames before the left boundary or after the right boundary decreases. That is, since these frames include different content than the content within the chunk boundaries, the content is less helpful in transcoding frames within the chunk boundaries because transcoding leverages similarities in content to transcode the content. Thus, the quality of the transcoding within the boundary is not greatly affected when using frames outside the boundary. However, if the frames before the left boundary or after the right boundary include similar content to the frames within the left boundary or right boundary, respectively, these frames may be useful to transcode the chunk. In this case, chunk splitter 102 may include more frames before the left boundary or after the right boundary because these frames may be useful in the transcoding process and possibly increase the quality of the transcoding.

Accordingly, if the video characteristics are similar or consistent before and/or after a chunk boundary, chunk splitter 102 increases the amount of the backward overlapping frames and/or the forward overlapping frames to align the transcoding context across neighboring chunks. If the video characteristics are not similar or different, such as meeting a threshold for dissimilarity for a characteristic, then chunk splitter 102 may use fewer backward overlapping frames and/or forward overlapping frames (or zero). The use of fewer overlapping frames may save computational workload as the transcoding unit 104 needs to transcode fewer frames. Chunk splitter may determine similarity by comparing a difference in a characteristic (e.g., texture or edges) to a threshold. For example, if the difference between a frame outside the chunk and within the chunk meets a threshold (e.g., is above), then the frames are not similar. If the difference between a frame outside the chunk and within the chunk does not meet a threshold (e.g., is below), then the frames are similar.

Figure 3:
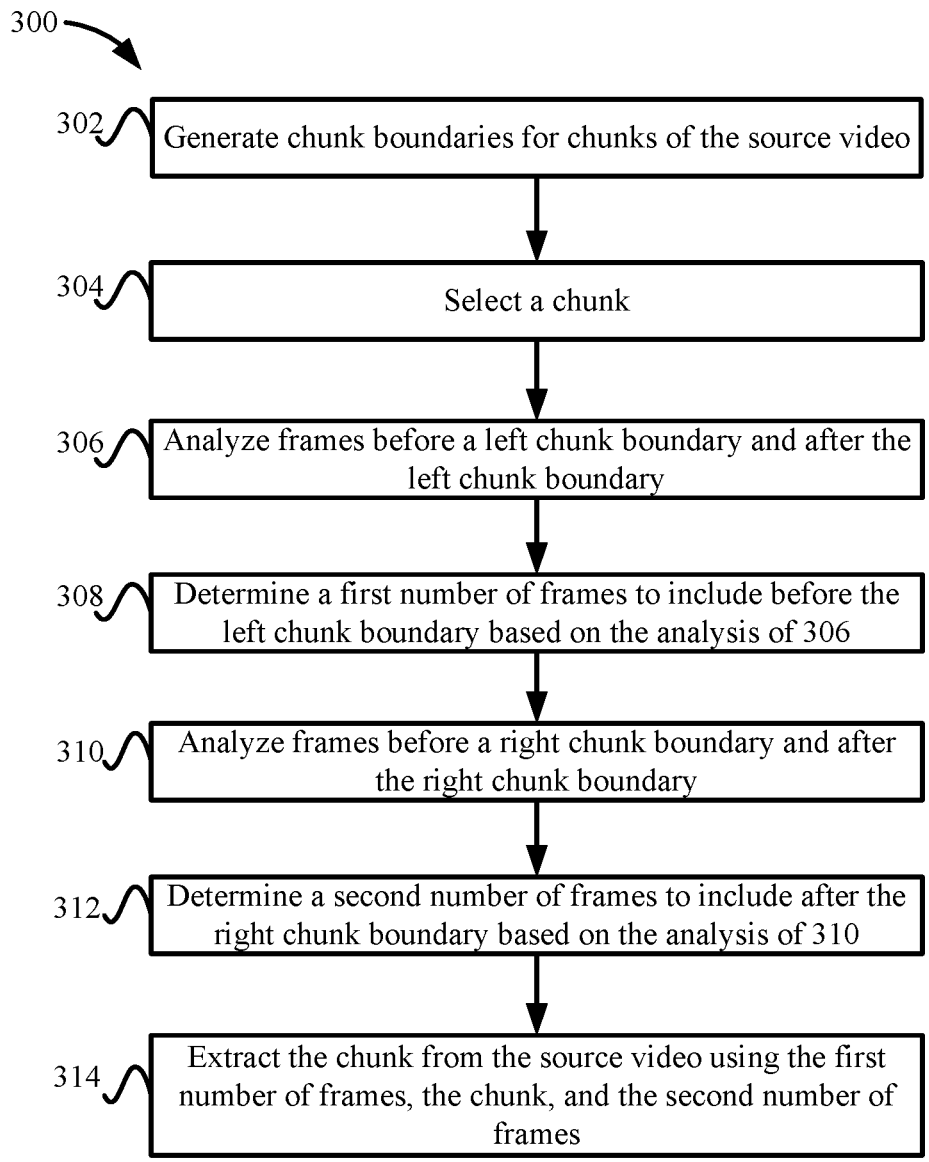
FIG. 3 depicts a simplified flowchart of a method for generating chunks according to some embodiments.

FIG. 3 depicts a simplified flowchart 300 of a method for generating chunks according to some embodiments. At 302, chunk splitter 102 generates chunk boundaries for chunks of source video 202. The chunk boundaries may be generated based on any of the techniques described above.

At 304, chunk splitter 102 selects a chunk. Then, at 306, chunk splitter 102 analyzes frames before a left chunk boundary and after the left chunk boundary. The analysis may analyze different video characteristics for similarity.

At 308, chunk splitter 102 determines a first number of frames to include before the left chunk boundary based on the analysis performed at 306. For example, 0 to X number of frames may be selected. In some examples, the number of frames is based on how similar the frames before the left chunk boundary are to a number of frames after the left chunk boundary.

At 310, chunk splitter 102 analyzes frames before a right chunk boundary and after the right chunk boundary. The analysis may be the same as on the left chunk boundary except at the other side of the chunk. At 312, chunk splitter 102 determines a second number of frames to include after the right chunk boundary based on the analysis at 310.

At 314, chunk splitter 102 extracts the chunk from source video 202 using the first number of frames, the chunk, and the second number of frames.

Transcoding units 104-1 to 104-N then transcode the chunks that are received. Transcoding units 104 may receive different size chunks or the same size chunks. For example, one transcoding unit 104-1 may receive a chunk that includes only forward overlapping frames; a transcoding unit 104-2 may receive a chunk with only backward overlapping frames; and a transcoding unit 104-3 may receive a chunk with forward overlapping frames and backward overlapping frames. Accordingly, transcoding units 104 may be transcoding different length chunks.

When transcoding units 104 transcode the chunks and corresponding backward/forward overlapping frames, IDR frames should be inserted at proper locations. The insertion of the IDR frames is to assist chunk assembler 106 in the removal of overlapping frames and cascade chunk needed.

Figure 5:
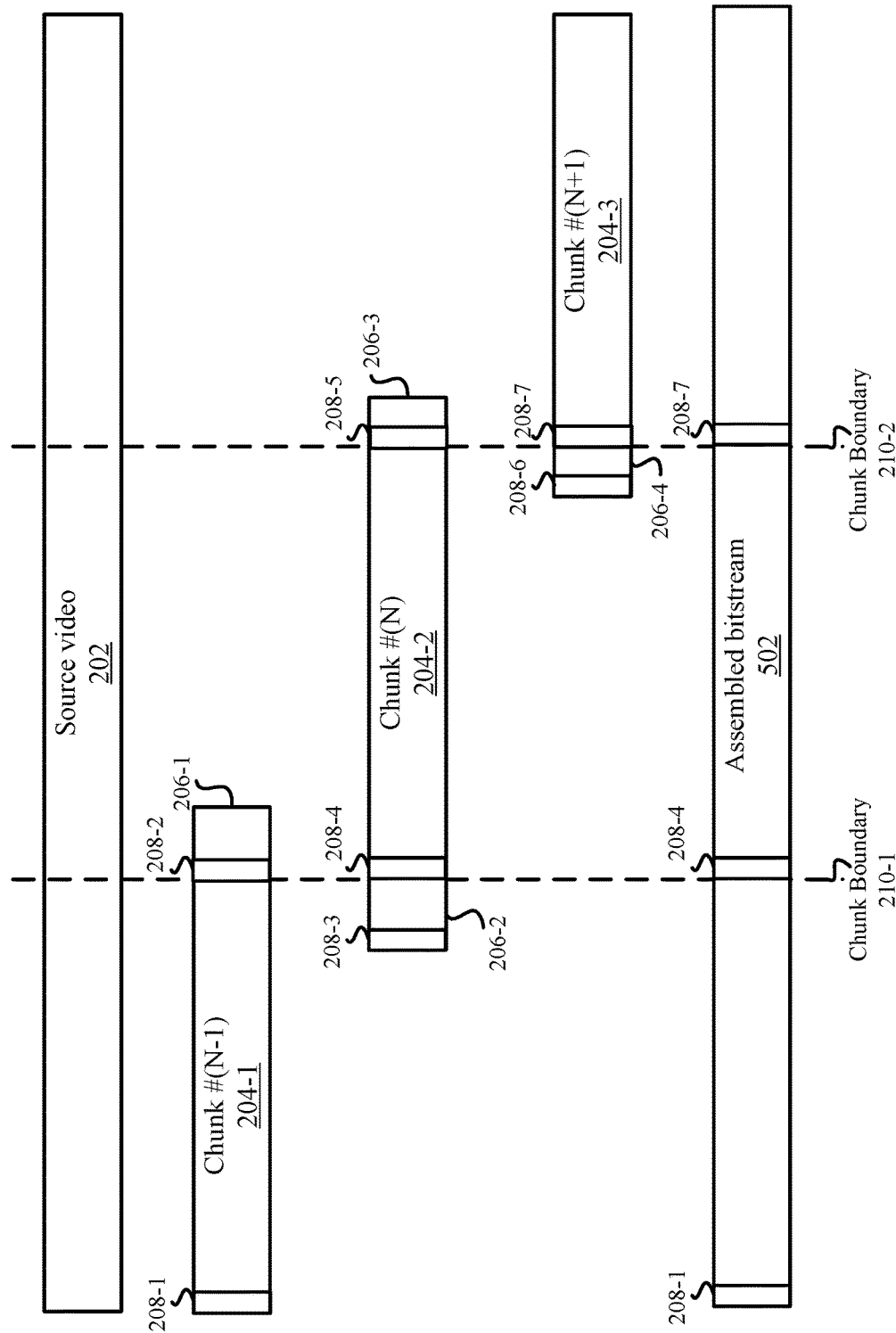
FIG. 5 depicts an example of the sub-bitstreams and creating the assembled bitstream according to some embodiments.

FIG. 5 depicts the IDR frame insertion during the transcoding process according to some embodiments. Specifically, for backward overlapping frames of a chunk, transcoding unit 104 transcodes the first frame as an IDR frame. For example, when transcoding unit 104 transcodes chunk #(N) 204-2, transcoding unit 104 transcodes the backward overlapping frames 206-2 first. Transcoding unit 104 transcodes the first backward overlapping frame 208-3 as an IDR frame. Similarly, when transcoding unit 104 transcodes the backward overlapping frames 206-4 for chunk #(N+1) 204-3, transcoding unit 104 transcodes the first backward overlapping frame 208-6 as an IDR frame.

For frames within the chunk boundaries for the chunk, the first frame should be encoded as IDR frame. For chunk #(N−1) 204-1, transcoding unit 104 transcodes the frames in the chunk because there are no backward overlapping frames. Transcoding unit 104 transcodes first frame 208-1 as an IDR frame. For chunk #(N) 204-2, transcoding unit 104 transcodes frames in the chunk after backward overlapping frames 206-2 are transcoded. Its first frame 208-4, which is located after the left chunk boundary 210-1, is transcoded as an IDR frame. Similarly, for chunk #(N+1) 204-3, transcoding unit 104 transcodes frames in the chunk after backward overlapping frames 206-4 being transcoded. The first frame 208-7, which is located after the left chunk boundary 210-2, is transcoded as an IDR frame.

For forward overlapping frames of a chunk, the first frame should be encoded as an IDR frame. For chunk #(N−1) 204-1, transcoding unit 104 transcodes forward overlapping frames 206-1 after the frames in the chunk are transcoded. The first frame 208-2, which is located after the right chunk boundary 210-1, is transcoded as an IDR frame. For chunk #(N) 204-2, transcoding unit 104 transcodes forward overlapping frames 206-3 after transcoding the backward overlapping frames 206-2 and frames in the chunk. The first frame 208-5, which is located after the right chunk boundary 210-2, is transcoded as an IDR frame.

Chunk Assembly

Figure 4:
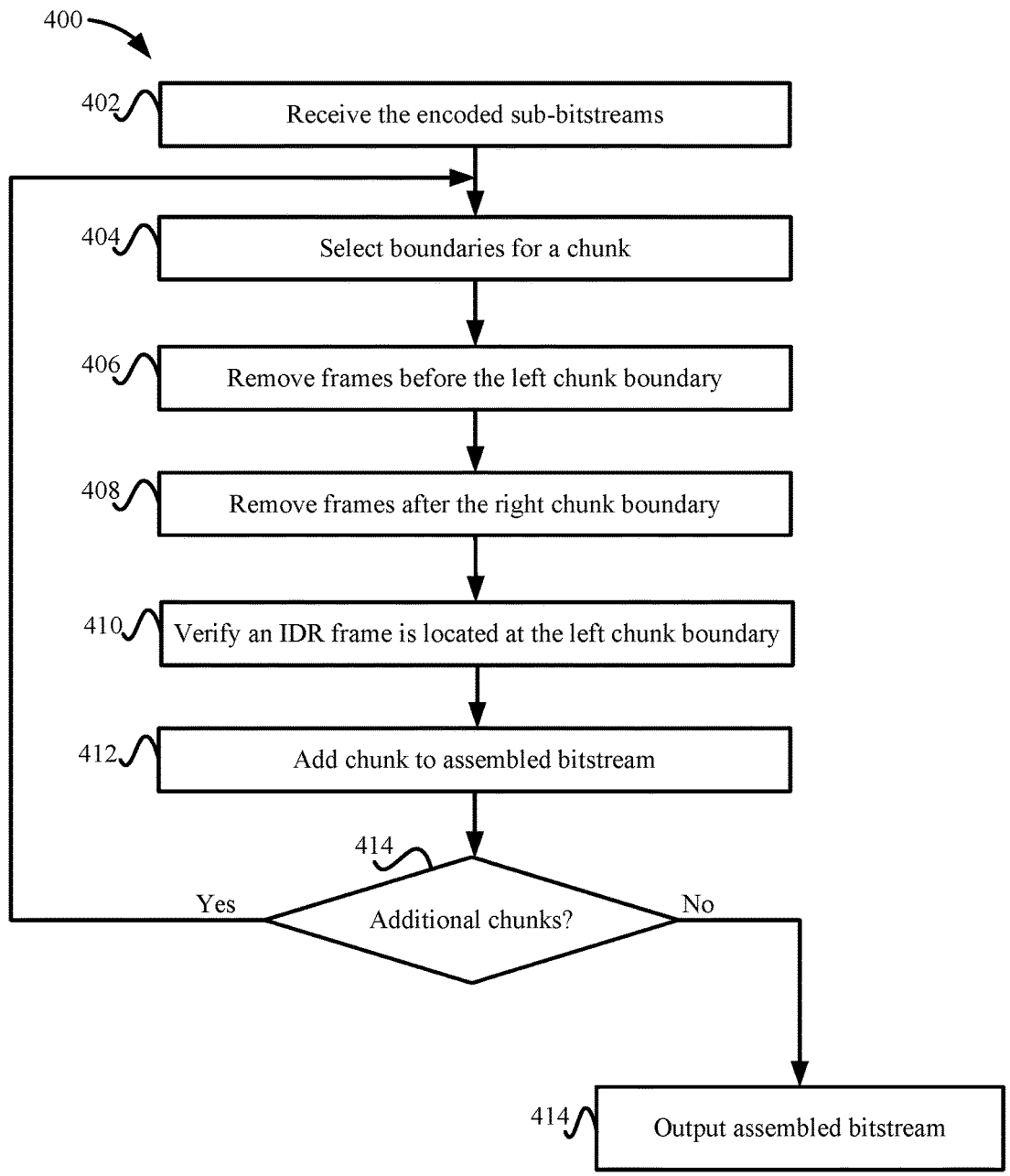
FIG. 4 depicts a simplified flowchart of a method for assembling sub-bitstreams into an assembled bitstream according to some embodiments.

Chunk assembler 106 receives the sub-bitstreams and assembles the sub-bitstreams into an assembled bitstream. FIG. 4 depicts a simplified flowchart 400 of a method for assembling sub-bitstreams into an assembled bitstream according to some embodiments. At 402, chunk assembler 106 receives the transcoded sub-bitstreams.

At 404, chunk assembler 106 then selects boundaries for a chunk. For example, for a chunk #N, chunk assembler 106 selects a left chunk boundary 210-1 and a right chunk boundary 210-2. At 406, chunk assembler 106 removes frames before the left chunk boundary. Then, at 408, chunk assembler 106 removes frames after the right chunk boundary.

At 410, chunk assembler 106 verifies an IDR frame is located at left chunk boundary 210-1. The IDR frame at the beginning of the chunk is needed because this chunk is a group of pictures that does not use information from another group of pictures. The group of pictures requires an IDR frame at the beginning.

At 412, chunk assembler 106 adds a chunk to the assembled bitstream. At 414, chunk assembler 106 then determines if additional chunks need to be processed. If so, the process reiterates to 404 where boundaries for another chunk are determined. For example, the next chunk may be processed. If there are not additional chunks, at 414 chunk assembler outputs the assembled bitstream.

FIG. 5 depicts an example of the sub-bitstreams and creating the assembled bitstream according to some embodiments. For a chunk #(N−1), chunk assembler 106 removes the frames after chunk boundary 210-1 shown at 206-1. Chunk #(N−1) also includes an IDR frame at 208-1. Chunk assembler 106 then includes chunk #(N−1) in assembled bitstream 502.

Chunk assembler 106 then processes chunk #(N) by removing the frames at 206-2 before chunk boundary 210-1 and the frames at 206-3 after chunk boundary 210-2. Chunk assembler 106 also determines that an IDR frame 208-4 is included at the beginning of chunk #(N). Chunk assembler 106 includes chunk #(N) in assembled bitstream 502.

Similarly, chunk assembler 106 removes the frames at 206-4 before chunk boundary 210-2 and includes chunk #(N+1) in assembled bitstream 502. Chunk #(N+1) includes an IDR frame 208-7 at the beginning of the chunk.

Although the above method for determining the chunks may be used, other methods may be used. For example, chunk assembler 106 may use matching IDR frames in consecutive chunks to determine the chunk boundaries.

As shown in FIG. 5, IDR frames are shown from 208-1 to 208-7. Some IDR frames 208 are located in the backward overlapping frames or forward overlapping frames. Chunk assembler 106 uses the IDR frames in consecutive chunks to extract and cascade chunks.

Figure 6:
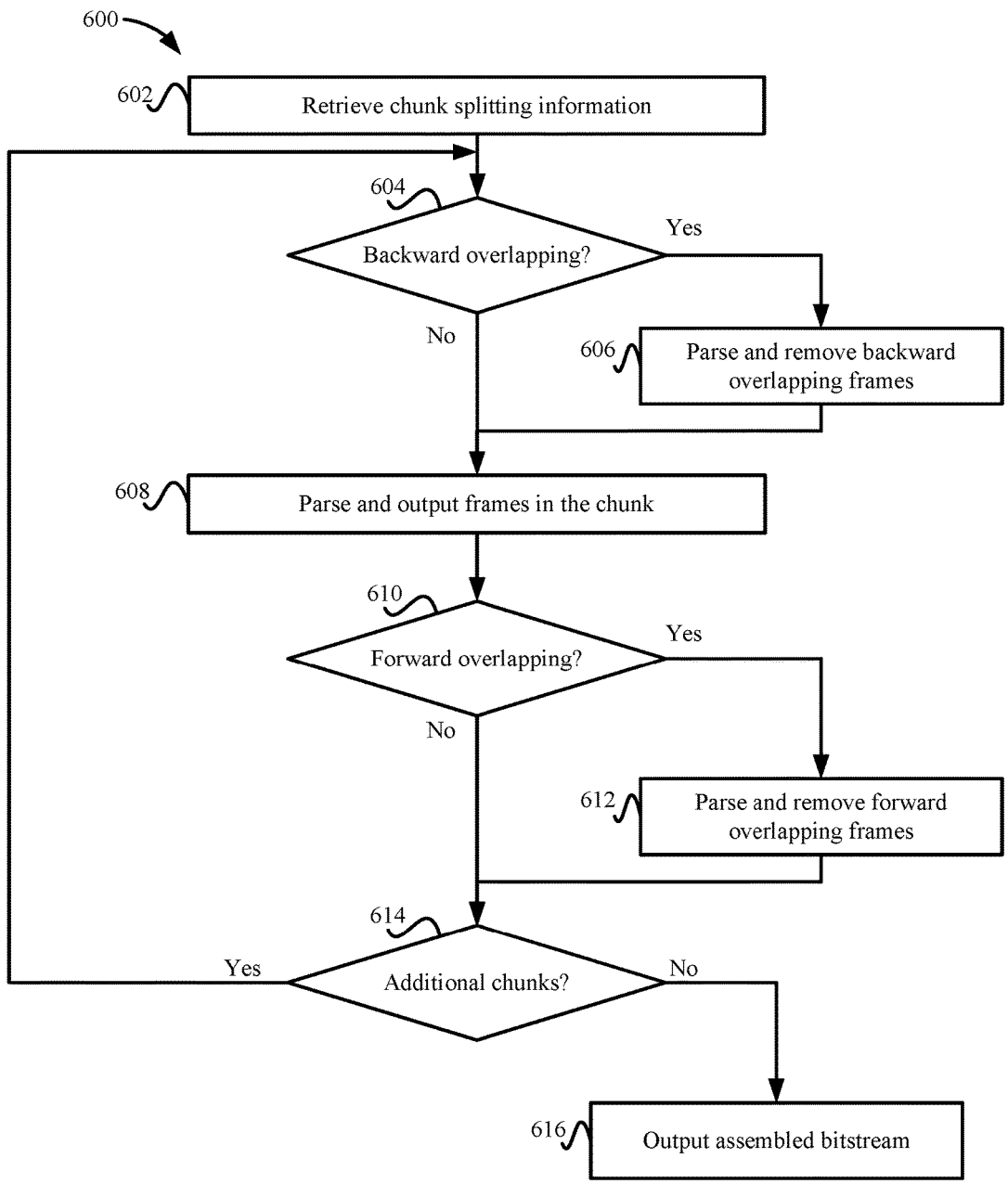
FIG. 6 depicts a simplified flowchart of a method for determining chunks using the instantaneous decoding refresh (IDR) frames according to some embodiments.

FIG. 6 depicts a simplified flowchart 600 of a method for extracting and cascading the chunks according to some embodiments. At 602, chunk assembler 106 retrieves the chunk splitting information from chunk parallel scheduler 110, including the positions of left boundaries and right boundaries, and number of backward overlapping frames and forward overlapping frames for chunks.

At 604, transcoding unit 104 determines if backward overlapping frames exist for a chunk. If backward overlapping frames exist, at 606 chunk assembler 106 parses the sub-bitstream and removes the backward overlapping frames. For example, in FIG. 5, backward overlapping frames 206-2, which start from IDR 208-3 and end at a frame before the left chunk boundary 210-1, are removed and not output for chunk #(N) 204-2. Similarly, backward overlapping frames 206-4, which start from IDR 208-6 and end at frame before the left chunk boundary 210-2, are removed and not output for chunk #(N+1) 204-3.

At 608, chunk assembler 106 parses the sub-bitstream and outputs the frames in a chunk. For example, for chunk #(N−1) 204-1 in FIG. 5, frames starting from IDR 208-1 and ending at a frame before the right chunk boundary 210-1, are extracted from sub-bitstream and output. For chunk #(N) 204-2 in FIG. 5, frames starting from IDR 208-4 and ending at a frame before the right chunk boundary 210-2, are extracted from sub-bitstream and output. For chunk #(N+1) 204-3 in FIG. 5, frames starting from IDR 208-7 and ending at the end of sub-bitstream, are extracted from sub-bitstream and output.

At 610, transcoding unit 104 determines if forward overlapping frames exist for a chunk. At 612, if forward overlapping frames exist, chunk assembler 106 parses the sub-bitstream and removes the forward overlapping frames. For example, in FIG. 5, forward overlapping frames 206-1, which start from IDR 208-2 and end at the end of sub-bitstream, are removed and not output for chunk #(N−1) 204-1. Similarly, forward overlapping frames 206-3, which start from IDR 208-5 and end at the end of sub-bitstream, are removed and not output for chunk #N 204-2.

At 614, chunk assembler 106 determines if there are any additional chunks to process. If so, the process reiterates to 604 to process the next chunk. If there are no additional chunks to process, chunk assembler 106 outputs the assembled bitstream at 616.

Conclusion

Accordingly, the chunk parallel transcoding process may improve the transcoding process by performing the transcoding in parallel. Quality at the chunk boundaries may fluctuate due to the parallel transcoding. Accordingly, system 100 may add frames to the chunks to increase the quality of the transcoding. The frames may be added based on analyzing the video characteristics. The analysis of the video characteristics may save computing resources because extra frames may not be added if the frames are not useful to improve the transcoding.

System

Figure 7:
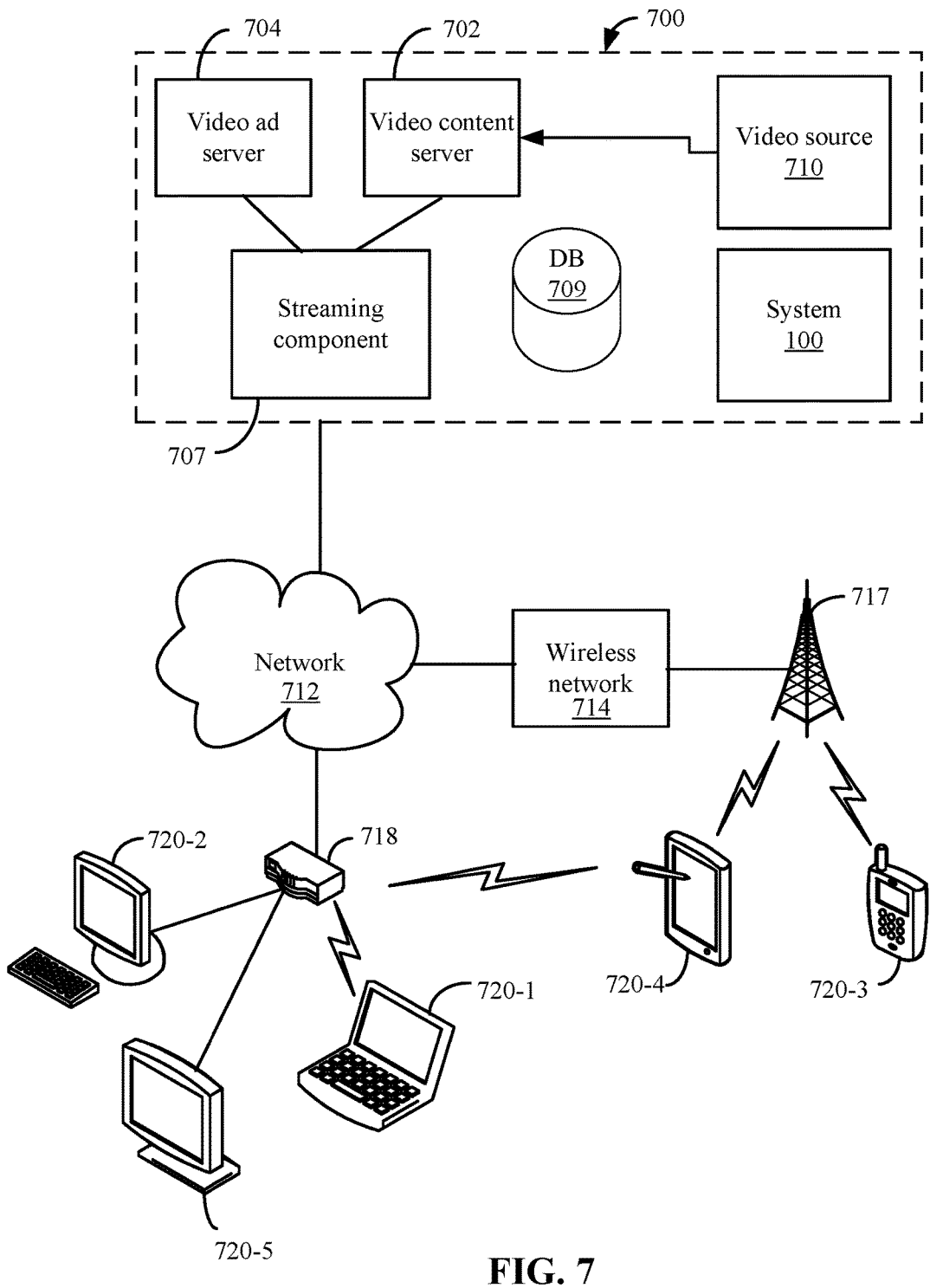
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoding unit. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 700, a public service message, or some other information. The video advertising server 704 may serve the video advertising segments as directed by a user interface controller (not shown).

The video streaming system 700 also may include system 100.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
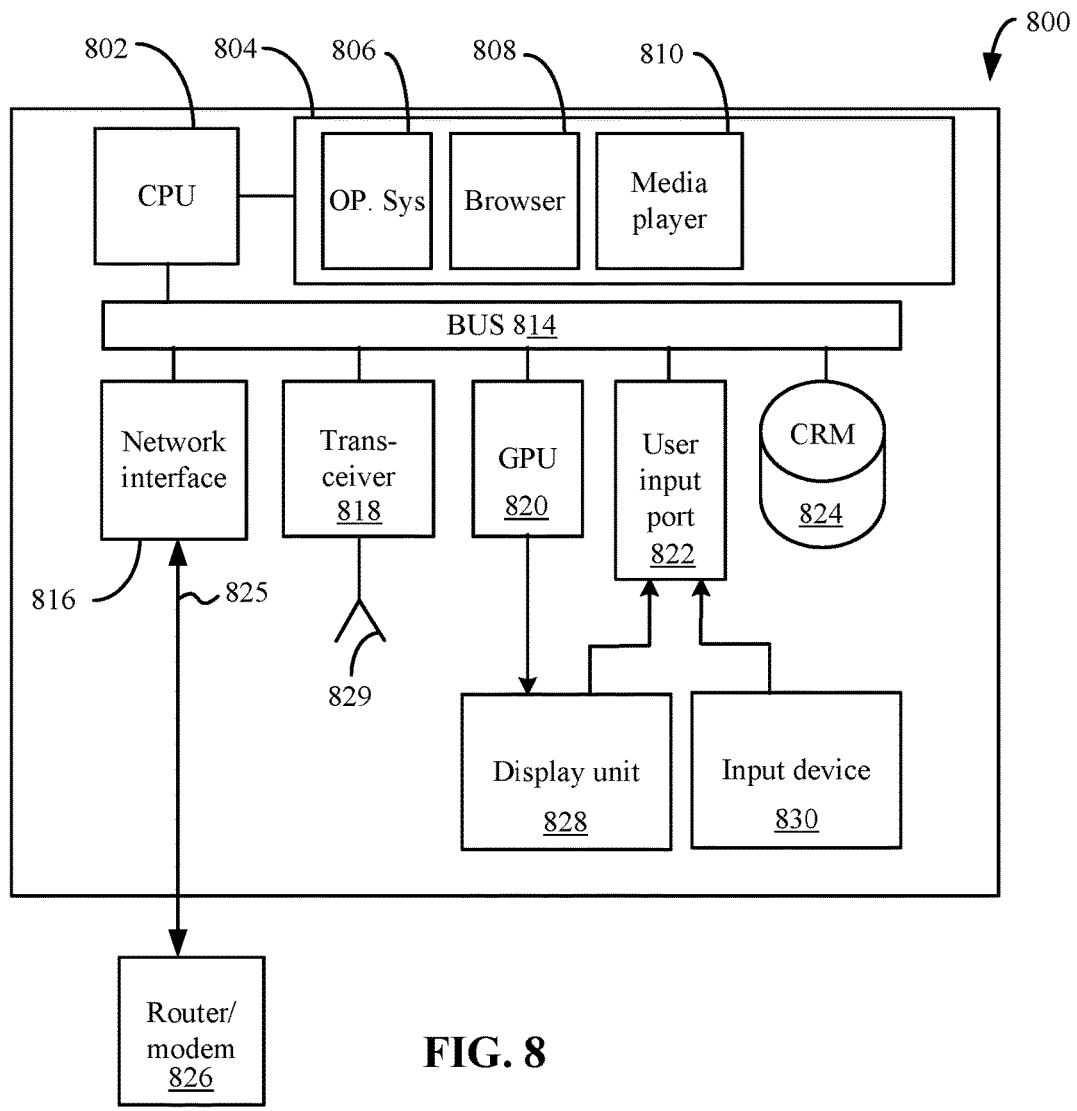
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims.

Based on the above disclosure and the following claims, other arrangements, embodiments, implementations and equivalents may be employed without departing from the scope hereof as defined by the claims.

What is claimed is:

1. A method comprising:
   generating, by a computing device, a plurality of chunk boundaries that are used to form a plurality of chunks from a video, the plurality of chunks being transcoded by a plurality of transcoding units in parallel;
   selecting, by the computing device, at least one of a first number of frames before a first boundary of a chunk and a second number of frames after a second boundary of the chunk;
   generating, by the computing device, a chunk that includes the at least one of the first number of frames and the second number of frames, and a third number of frames between the first boundary and the second boundary;
   transcoding, by the computing device, the chunk to generate a transcoded chunk using a first transcoding unit in the plurality of transcoding units; and
   sending, by the computing device, the chunk to a chunk assembler, wherein the chunk assembler removes the at least one of the first number of frames and the second number of frames from the chunk and adds the third number of frames between the first boundary and the second boundary of the chunk to a transcoded bitstream.

2. The method of claim 1, wherein removing the at least one of the first number of frames and the second number of frames comprises removing overlapping frames from transcoded chunks from transcoding units in the plurality of transcoding units before adding chunks to the transcoded bitstream.

3. The method of claim 2, wherein the overlapping chunks are removed from chunks that are outside chunk boundaries for the chunks.

4. The method of claim 1, wherein removing the at least one of the first number of frames and the second number of frames comprises removing overlapping frames from transcoded chunks from transcoding units in the plurality of transcoding units by identifying instantaneous decoding refresh (IDR) frames at a beginning of the first number of frames, at a beginning of the second number of frames, and at a beginning of the third number of frames between first boundary and the second boundary.

5. The method of claim 1, wherein generating the plurality of chunk boundaries comprises:
   using a fixed length method to generate chunk boundaries for fixed length chunks.

6. The method of claim 1, wherein generating the plurality of chunk boundaries comprises:
   using a fixed count method to generate chunk boundaries for fixed count of chunks.

7. The method of claim 1, wherein generating the plurality of chunk boundaries comprises:
   using a fixed size method to generate chunk boundaries for chunks of a fixed size.

8. The method of claim 1, wherein generating the plurality of chunk boundaries comprises:
   using a scene change method to generate chunk boundaries at scene changes.

9. The method of claim 1, wherein generating the plurality of chunk boundaries comprises:

using instantaneous decoding refresh (IDR) frames in the video to generate chunk boundaries at IDR frame positions.

10. The method of claim 1, wherein selecting the at least one of the first number of frames and the second number of frames comprises:
  using a first fixed number to select the first number of frames and a second fixed number to select the second number of frames.

11. The method of claim 1, wherein selecting the at least one of the first number of frames and the second number of frames comprises:
  analyzing characteristics of the content to determine the first number of frames and the second number of frames.

12. The method of claim 11, wherein analyzing characteristics of the content to determine the at least one of the first number of frames and the second number of frames comprises:
  increasing the first number of frames when characteristics of the content before the first boundary of the chunk and after the first boundary of the chunk are similar and decreasing the first number of frames when characteristics of the content before the first boundary of the chunk and after the first boundary of the chunk are less similar; and
  increasing the second number of frames when characteristics of the content before the second boundary of the chunk and after the second boundary of the chunk are similar and decreasing the second number of frames when characteristics of the content before the second boundary of the chunk and after the second boundary of the chunk are less similar.

13. The method of claim 11, wherein analyzing characteristics of the content to determine the at least one of the first number of frames and the second number of frames comprises:
  comparing characteristics of the content before the first boundary of the chunk and after the first boundary of the chunk;
  selecting the first number of frames based on the comparing;
  comparing characteristics of the content before the second boundary of the chunk and after the second boundary of the chunk; and
  selecting the second number of frames based on the comparing.

14. The method of claim 1, wherein transcoding the chunk comprises:
  transcoding the at least one of the first number of frames and the second number of frames, and the third number of frames.

15. The method of claim 14, wherein the at least one of the first number of frames and the second number of frames, and the third number of frames are transcoded serially without using any other chunks.

16. A non-transitory computer-readable storage medium containing instructions, that when executed, control a computer system to be configured for:
  generating a plurality of chunk boundaries that are used to form a plurality of chunks from a video, the plurality of chunks being transcoded by a plurality of transcoding units in parallel;
  selecting at least one of a first number of frames before a first boundary of a chunk and a second number of frames after a second boundary of the chunk;
  generating a chunk that includes the at least one of the first number of frames and the second number of frames, and a third number of frames between the first boundary and the second boundary;
  transcoding the chunk to generate a transcoded chunk using a first transcoding unit in the plurality of transcoding units; and
  sending the chunk to a chunk assembler, wherein the chunk assembler removes the at least one of the first number of frames and the second number of frames from the chunk and adds the third number of frames between the first boundary and the second boundary of the chunk to a transcoded bitstream.

17. The non-transitory computer-readable storage medium of claim 16, wherein selecting the at least one of the first number of frames and the second number of frames comprises:
  analyzing characteristics of the content to determine the first number of frames and the second number of frames.

18. The non-transitory computer-readable storage medium of claim 16, wherein analyzing characteristics of the content to determine the at least one of the first number of frames and the second number of frames comprises:
  increasing the first number of frames when characteristics of the content before the first boundary of the chunk and after the first boundary of the chunk are similar and decreasing the first number of frames when characteristics of the content before the first boundary of the chunk and after the first boundary of the chunk are less similar; and
  increasing the second number of frames when characteristics of the content before the second boundary of the chunk and after the second boundary of the chunk are similar and decreasing the second number of frames when characteristics of the content before the second boundary of the chunk and after the second boundary of the chunk are less similar.

19. The non-transitory computer-readable storage medium of claim 16, wherein analyzing characteristics of the content to determine the at least one of the first number of frames and the second number of frames comprises:
  comparing characteristics of the content before the first boundary of the chunk and after the first boundary of the chunk;
  selecting the first number of frames based on the comparing;
  comparing characteristics of the content before the second boundary of the chunk and after the second boundary of the chunk; and
  selecting the second number of frames based on the comparing.

20. An apparatus comprising:
  one or more computer processors; and
  a non-transitory computer-readable storage medium comprising instructions, that when executed, control the one or more computer processors to be configured for:
  generating a plurality of chunk boundaries that are used to form a plurality of chunks from a video, the plurality of chunks being transcoded by a plurality of transcoding units in parallel;
  selecting at least one of a first number of frames before a first boundary of a chunk and a second number of frames after a second boundary of the chunk;
  generating a chunk that includes the at least one of the first number of frames and the second number of frames, and a third number of frames between the first boundary and the second boundary;

transcoding the chunk to generate a transcoded chunk using a first transcoding unit in the plurality of transcoding units; and sending the chunk to a chunk assembler, wherein the chunk assembler removes the at least one of the first number of frames and the second number of frames from the chunk and adds the third number of frames between the first boundary and the second boundary of the chunk to a transcoded bitstream.

* * * * *